(12) United States Patent
Szajdecki

(10) Patent No.: US 8,509,114 B1
(45) Date of Patent: Aug. 13, 2013

(54) CIRCUIT EMULATION SERVICE OVER IP WITH DYNAMIC BANDWIDTH ALLOCATION

(75) Inventor: Richard Szajdecki, Jackson, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1059 days.

(21) Appl. No.: 12/107,386

(22) Filed: Apr. 22, 2008

(51) Int. Cl.
*H04L 12/28* (2006.01)
*H04J 3/22* (2006.01)

(52) U.S. Cl.
USPC ............ 370/254; 370/356; 370/401; 370/466

(58) Field of Classification Search
None
See application file for complete search history.

(56) References Cited

U.S. PATENT DOCUMENTS

| | | | |
|---|---|---|---|
| 6,728,261 B1* | 4/2004 | Sasson et al. ................. | 370/466 |
| 6,731,649 B1* | 5/2004 | Silverman ..................... | 370/466 |
| 6,751,218 B1* | 6/2004 | Hagirahim et al. ........... | 370/390 |
| 6,798,785 B1* | 9/2004 | Sasson et al. ................. | 370/466 |
| 6,865,150 B1* | 3/2005 | Perkins et al. ................ | 370/230 |
| 6,963,561 B1* | 11/2005 | Lahat ............................ | 370/356 |
| 7,002,935 B2* | 2/2006 | Kriaras et al. ................ | 370/328 |
| 7,257,110 B2* | 8/2007 | Laxman et al. ............... | 370/352 |
| 7,468,988 B2* | 12/2008 | Pail et al. ...................... | 370/466 |
| 7,529,846 B2* | 5/2009 | Ramaswamy ................ | 709/231 |
| 7,532,613 B1* | 5/2009 | Sen et al. ...................... | 370/352 |
| 7,564,835 B1* | 7/2009 | Grabelsky et al. ............ | 370/352 |
| 7,751,408 B2* | 7/2010 | Pirbhai et al. ............. | 370/395.5 |
| 2002/0015391 A1* | 2/2002 | Kriaras et al. ................ | 370/328 |
| 2002/0122416 A1* | 9/2002 | Xu et al. ........................ | 370/352 |
| 2003/0048780 A1* | 3/2003 | Phomsopha ................... | 370/389 |
| 2004/0252683 A1* | 12/2004 | Kennedy et al. .............. | 370/389 |
| 2007/0058543 A1* | 3/2007 | Fenart et al. .................. | 370/230 |
| 2008/0002669 A1* | 1/2008 | O'Brien et al. ............... | 370/352 |
| 2008/0069148 A1* | 3/2008 | Wu ................................ | 370/498 |
| 2009/0190610 A1* | 7/2009 | Pirbhai et al. ................ | 370/466 |

OTHER PUBLICATIONS

The ATM Forum Technical Committee, "Circuit Emulation Service Interoperability Specification", Sep. 1995, 62 pp., AF-SAA-0032. 000.
Axerra Networks Inc., "Circuit Emulation Pseudo-Wire (CE-PW)", White Paper, 11 pp., Axerra Networks, Inc. (2000-2005).
Cohen, et al., "Applicability Statement for Edge to Edge Emulation of Time Division Multiplexing (TDM) Services Over Packet Switched Networks (PSN)", IETF, http://tools.ietf.org/id/draft-cohen-pwe3-tdmsonetapp-00.txt, Jun. 2002, 12 pp., The Internet Society (2001).
Frost, Tim, "Circuit Emulation Over Packet Switched Networks", White Paper, Jul. 2003, 9 pp. Zarlink Semiconductor Inc.
ITU-T Recommendation Y.1413, "TDM-MPLS Network Interworking—User Plane Interworking", Mar. 2004, 32 pp., International Telecommunication Union.
Lang, Tao, "Circuit Emulation in Broadband Access: Converging TDM/Data on the Last Mile", analog ZONE, 6 pp., Zarlink Semiconductor.
Noro, Raffaele, "Synchronization Over Packet-Switching Networks: Theory and Applications", Thesis, 2000, 142, pp., Swiss Federal Institute of Technology, Switzerland.

(Continued)

Primary Examiner — Gregory Sefcheck
Assistant Examiner — Joshua Smith
(74) Attorney, Agent, or Firm — Sheridan Ross P.C.

(57) ABSTRACT

Method and apparatus provide in-band dynamic bandwidth management in a circuit-switched emulation service over Internet Protocol.

18 Claims, 5 Drawing Sheets

(56) References Cited

OTHER PUBLICATIONS

Schulzrinne, et al., "RTP: A Transport Protocol for Real-Time Applications", Network Working Group, RFC3550, IETF, http://www.ietf.org/rfc/rfc3550.txt, Jul. 2003, 93 pp., The Internet Society (2003).

Schwartz, Eitan, "TDMoIP vs. VoIP, Matching Technology to Requirements", White Paper, Aug. 2003, 40 pp., RAD data communications, Tel Aviv, Israel.

Stein, et al., "TDM over IP", IETF, http://tools.ietf.org/html/draft-ietf-pwe3-tdmoip-06.txt, Dec. 2006, 44 pp., The Internet Society (2006).

Vainshtein et al., "Structure-Aware TDM Circuit Emulation Service Over Packet Switched Network (CESoPSN)", IETF, http://tools.ietf.org/html/draft-ietf-pwe3-cesopsn-07.txt, May 2006, 29 pp., The Internet Society.

\* cited by examiner

FIG. 3

80 — AN ENDPOINT DEVICE-ANALOG DEVICE 41-44 OR DIGITAL DEVICE 45 COMMUNICATING WITH GATEWAY 50 GOES OFF HOOK AND DIALS THE APPROPRIATE DIGITS TO CONNECT TO AN ENDPOINT DEVICE-ANALOG DEVICE 41-44 OR DIGITAL DEVICE 45 COMMUNICATING WITH GATEWAY 70. IF THE CALL IS ANSWERED, AN EMULATED CIRCUIT-SWITCHED CONNECTION IS ESTABLISHED FOR EACH LEG OF THE CALL.

90 — THE CALL HAS BEEN ANSWERED, AND CIRCUIT-SWITCHED TRANSMISSION DATA (VOICE, VIDEO, OR DATA) IS DIGITIZED AND PLACED ON TDM BUS 65 BY ANALOG LINE CARD 57 OR DIGITAL LINE CARD 58. FOR EXAMPLE, VOICE DATA IS COLLECTED IN FRAMES OF N OCTETS OCCURRING AT 8kHz RATE OR N*64kbps.

100 — VoIP INTERFACE 51 TAKES TDM TRANSMISSION DATA OFF THE TDM BUS 65 AND ENCAPSULATES IT AS A PAYLOAD IN A UDP/IP/RTP/CESoIP PACKET. HERE EACH UDP/IP/RTP/CESoIP PAYLOAD OF CIRCUIT-SWITCHED TRANSMISSION DATA CONTAINS M FRAMES OF N OCTETS OCCURRING AT A MULTIPLE OF 8khz RATE. THE CALL CONTROLLER 55 PROVIDES CALL INFORMATION TO THE VoIP INTERFACE 51 ON GATEWAY 50. THE VoIP INTERFACE 51 USES THE INFORMATION TO CREATE THE CESoIP CW AND THE CAB. THE CAB MAPS EACH PARTICULAR EMULATED ACTIVE CIRCUIT TO AN ALLOCATED UNIQUE UDP DESTINATION PORT.

110 — GATEWAY 50 SENDS THE ENTIRE UDP/IP/RTP/CESoIP PACKET, WHICH INCLUDES THE CW, CAB, AND PAYLOAD, TO GATEWAY 70 VIA GATEWAY 70's IP ADDRESS AND THE STATIC DESTINATION UDP PORT ALLOCATED FOR THE CESoIP VIRTUAL CONNECTION ON GATEWAY 70. AT GATEWAY 70, THE UDP/IP/RTP/CESoIP PACKET IS DISASSEMBLED BY VoIP INTERFACE 71, WHICH SENDS EACH ACTIVE EMULATED CIRCUIT-SWITCHED CHANNEL'S DATA TO THE APPROPRIATE DSP RESOURCE VIA THE UDP DESTINATION PORT IDENTIFIED IN THE CAB. THE VoIP INTERFACE 71 PLACES THE CORRECTLY-SEQUENCED BUFFERED DATA ON THE TDM BUS 61 TO THE APPROPRIATE ENDPOINT-ANALOG ENDPOINT 41-44 OR DIGITAL ENDPOINT 45. AT THIS TIME, THE TRANSMISSION DATA COMPRISES FRAMES OF N OCTETS OCCURRING AT 8kHz RATE.

120 — WHILE THERE ARE ACTIVE EMULATED CIRCUIT-SWITCHED CHANNELS, THE CALL CONTROLLER 55 OF GATEWAY 50 PERIODICALLY SENDS THE CAB WITH THE TRANSMISSION DATA (VOICE, VIDEO, OR DATA) TO SYNCHRONIZE THE RECEPTION OF THE TRANSMISSION DATA AT GATEWAY 70. THE RTP SEQUENCE PACKET NUMBER IN THE RTP HEADER PROVIDES SEQUENCING DATA SUCH THAT CHANNEL DATA IN THE CAB ARE SEQUENCED WITH THE CESoIP TRANSMISSION DATA PAYLOAD. NOT EVERY CESoIP PACKET CONTAINS A CAB, BUT THE CAB IS SENT WHEN CALLS ARE ADDED AND/OR DROPPED.

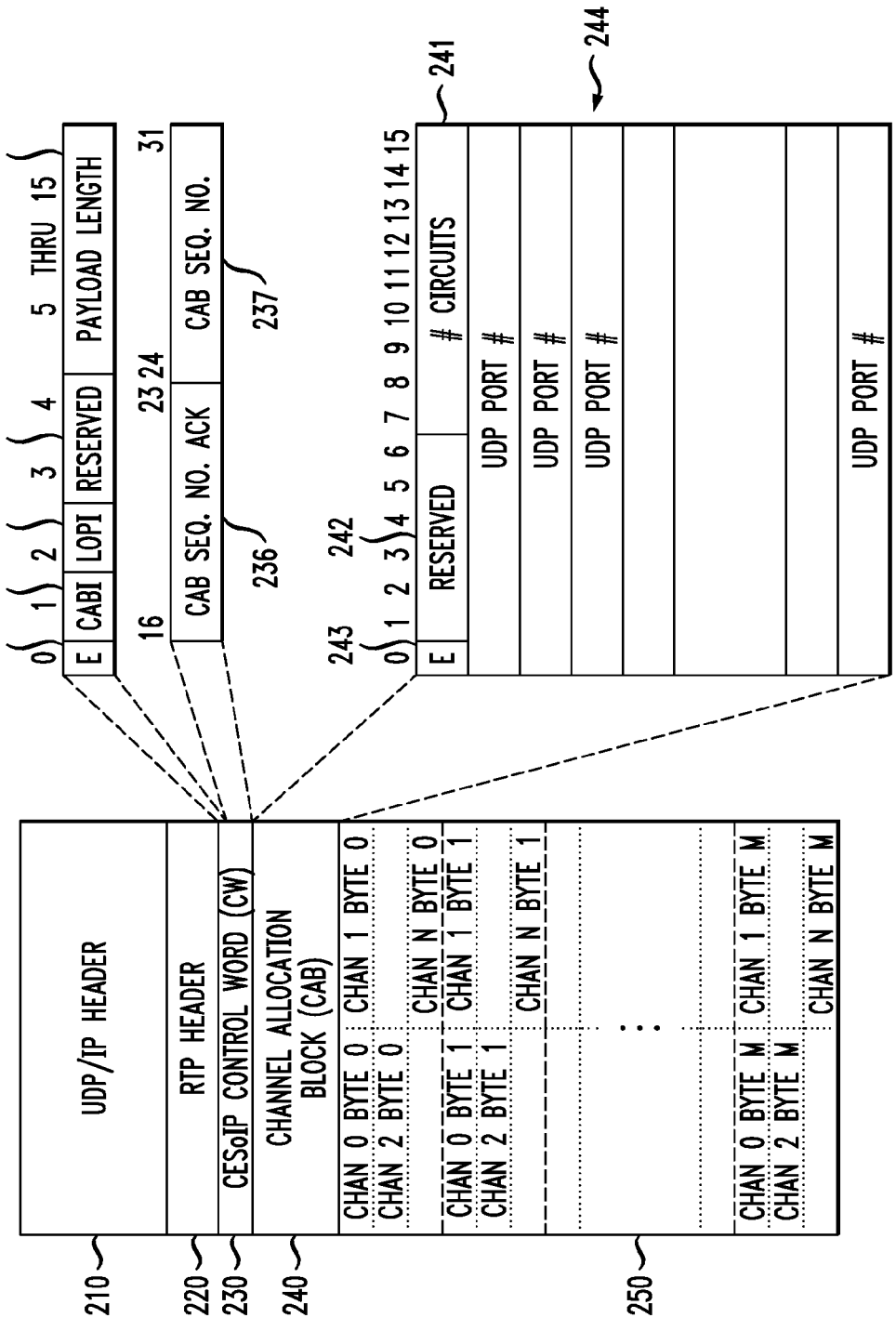

ALTERNATE CONTROL WORD

CIRCUIT EMULATION SERVICE OVER IP WITH DYNAMIC BANDWIDTH ALLOCATION

TECHNICAL FIELD

The method and apparatus relates generally to providing bandwidth management in a CESoIP service.

BACKGROUND

Many enterprises and "Baby Bell" network carriers continue to use telephony equipment that establishes circuit-switched telephone calls. Circuit-switched telephone calls use dedicated circuits for the duration of the call. Typically, enterprises lease a dedicated network connection, known as a circuit-switched trunk, from network carriers. The trunk connects independent telephony systems, such as, a Private Branch Exchange (PBX) to PBX, PBX to Central Office (CO), or CO to CO. At each traffic-originating end of the call, the telephony equipment's time-division multiplexer (TDM) combines two or more data streams by assigning each data stream a different "time-slot" (i.e., channel) within a TDM frame. Each channel has a fixed length of data. Each TDM frame includes one channel per data stream where each data stream "takes a turn" to send its data over a single communication line (i.e., trunk) to the terminating end of the call. In a similar manner, the telephony equipment transmits TDM modem data and video-conferencing data. Circuit-switched trunks use various protocols to signal across these trunks. Examples of the various protocols include 64 kbps DS0 on a T1 line, E1, T3, E3, ISDN BRI, switched 56, fractional T1, frame relay, etc.

Voice over IP (VoIP) establishes an end-to-end telephone call by transmitting digitized voice samples over the same packet-switched network that carries data. Unlike circuit-switched telephone equipment, the packet-switched network does not dedicate physical circuits to the communications. Although VoIP is the trend, many enterprises and network carriers desire a slow migration path from circuit-switched services to packet-switched services such as VoIP. For enterprises and carriers, a slow migration is necessary mostly due to the cost of the transition and the perceived quality-of-service issues with VoIP.

Circuit emulation is one method of migrating from circuit-switched services to packet-switched services. Circuit emulation originated in Asynchronous Transfer Mode (ATM) standards as carriers were upgrading their network-access equipment with ATM equipment to handle the increasing loads of traffic. The ATM standards define a method to emulate a TDM circuit across an ATM network. See, ATM Forum Technical Committee, *Circuit Emulation Service Interoperability Specification AF-SAA*-0032.000, (September 1995).

The ATM standards provide a method for unstructured and structured service. Unstructured service encapsulates an entire bit-stream (ex. T1) in one or more packets, without knowledge of the individual channels that may exist within the bit-stream. Structured service also encapsulates the bit-stream in one or more packets, but with knowledge of the individual channels within the bit-stream.

The IETF standards body is at the forefront of Circuit Emulation Service over PSN (CESoPSN) and TDM over IP (TDMoIP), which emulate a T1, E1, T3 or E3 circuit-switched connection over a packet-switched network (PSN) such as an Internet Protocol (IP) network, an Ethernet network, or a MPLS network. The IETF standards body has published recommendations for structured and unstructured emulation of TDM bit-streams using circuit emulation. The IETF Network Working Group published "Structure-aware TDM Circuit Emulation Service over Packet Switched Network (CESoPSN)," authored by A. Vainshtein, I. Sasson, E. Metz, T. Frost, P. Pate (May 2006), found at draft-ietf-pwe3-cesopsn-07.txt. For unstructured service, the IETF Pseudo-Wire Emulation Edge to Edge (PWE3) working group published "TDM over IP," authored by Y. Stein, R. Shashoua, R. Insler, M. Anavi, (Dec. 5, 2006), found at draft-ietf-pwe3-tdmoip-06.txt.

The majority of packet-switched networks use the Internet Protocol (IP) at the network layer. For IP networks, a Real-time Transfer Protocol (RTP) is used due to the real-time nature of the TDM voice and data transmission. The RTP packet encapsulates the TDM voice and data. The RTP protocol is defined in *RFC 3550-RTP: A Transport Protocol for Real-Time Applications*, Schulzrinne, et al. (July 2003).

Unfortunately, current CES recommendations increase the cost of migration from TDM to VoIP and may be error-prone. The CESoPSN recommendations statically assign bandwidth, which wastes bandwidth. The CESoPSN recommends a "Mixed amount of TDM data per packet: All the packets belonging to a given CESoPSN PW MUST carry the same amount of TDM data. This approach simplifies compensation of a lost PW packet with a packet carrying exactly the same amount of 'replacement' TDM data." CESoPSN does not provide for dynamic bandwidth-management due to the recommended fixed packet sizes.

The TDMoIP recommendation requires ATM methods for dynamic bandwidth-management, but ATM methods may not be available on all networks. As discussed in the "TDM over IP" reference, "TDMoIP transports real-time streams by first extracting bytes from the stream, and then adapting these bytes. TDMoIP offers two different adaptation algorithms, one for constant-rate real-time traffic, and one for variable-rate real-time traffic." TDMoIP provides for dynamic bandwidth-management via AAL2 methods, which require an underlying ATM layer in the network software.

The ITU has a circuit-emulation recommendation, T Y.1413. This recommendation discusses static and dynamic bandwidth-management. The dynamic bandwidth-management uses AAL2 methods, which requires an underlying ATM layer in the network software.

A thesis titled *Synchronization Over Packet Switching Networks: Theory and Applications*, by Raffael Noro, Thesis Number 2178, Ecole Polytechnique Federale de Lausanne (2000) recommends an out-of-band mechanism to provide dynamic bandwidth in a CESoIP network. This mechanism works by sending information regarding which circuits are still active via a separate Real-time Transmission Control Protocol (RTCP) packet. However, this extra packet introduces overhead on a possibly-congested packet-switched network. Additionally, if the RTCP packet is lost or delayed, this mechanism is error-prone. There may be a loss of synchronization at both endpoints of the network connection with regard to the number of active circuits reported. That is, there is a higher possibility of crosstalk or loss of talk-path, since the receiving endpoint does not know where the TDM data should go without additional information regarding which circuits are still active.

SUMMARY

The method and apparatus efficiently handle bandwidth needs by providing dynamic bandwidth-management in a circuit-switched emulation service over IP without utilizing ATM methods or an RTCP packet. The method and apparatus emulate a circuit-switched connection for each active channel and provide an in-band mechanism to assign bandwidth as needed within an encapsulated UDP/IP/RTP/CESoIP packet. The method and apparatus illustratively operate in an UDP/IP environment, but can also operate in other asynchronous network environments such as MPLS and Ethernet. Likewise, the method and apparatus can operate in synchronous networks such as SONET.

The transmission-control system (communication system operable to send transmissions, such as, voice, video, and data) IP address and an User Datagram Protocol (UDP) port define an endpoint of the CESoIP logical connection (i.e., pipe). The transmission-control system is commanded by a call controller to establish and complete transmission requests for voice, video and data transmissions. The call controller may reside in a separate media server and handle the transmission requests for one or more transmission-control systems. Alternatively, a call controller may reside in each separate transmission-control system and handle the transmission requests for a single transmission-control system. According to one aspect of the method and apparatus, to create a dedicated circuit-switching emulation service over IP (CESoIP) between a first and a second transmission-control system, a call controller handling transmission requests for each transmission-control system allocates a static UDP port for each endpoint of the CESoIP pipe.

The call controller may initially use a factory-installed static UDP port as the default setting when the transmission-control system is initially operable. Alternatively, the call controller may use an administered static UDP port entered for example via the administration pages of the transmission-control system. Once the CESoIP logical connection is defined for both endpoints, each endpoint starts-up the CESoIP connection independently. At this point, the CESoIP connection is available for emulated circuit-switched data transmission between both transmission-control systems.

Alternatively, a CESoIP pipe may be established on an ad-hoc basis, that is, the CESoIP pipe may be established on an "as needed" basis. In this case, IP packets are used to signal the request for the CESoIP pipe to the receiving transmission-control system. That is, the call controller will send IP packets to signal the need for the ad-hoc CESoIP pipe between the transmission-control systems. As an initial part of the set-up between both transmission-control systems, the call controller handling the transmission requests between both transmission-control systems allocates a static UDP port for both ends of the ad-hoc CESoIP pipe. If each transmission-control system has its own call controller, each will allocate a static UDP port for its transmission-control system. The receiving transmission-control system acknowledges the ad-hoc CESoIP request and satisfies the request by establishing the CESoIP connection.

As previously stated, an IP address and a static UDP port identify each endpoint of the CESoIP pipe. In a synchronous network, such as SONET, the CESoIP connection may use a unique circuit-number identifier to identify a dedicated endpoint at each end of the CESoIP connection and the allocated destination port for the active emulated circuit-switched channel.

After establishing the dedicated or ad-hoc CESoIP connection between the transmission-control systems, the CESoIP service may now begin the in-band dynamic bandwidth-management as part of its service. The call controller handling calls, for the transmission-control system originating the transmission, allocates a first destination port for the circuit-switched emulated channel, which defines a first endpoint for the particular call. The call controller handling calls, for the transmission-control system receiving the transmission, allocates a destination port for the second endpoint of the circuit-switched emulated channel. Identities of the destination ports for the particular call are exchanged between the transmission-control systems in a channel-allocation block (CAB), and the source information (ex., transmission-control system IP address and static UDP port) is part of the RTP packet header. The channel-allocation block (CAB) identifies active emulated circuit-switched channel(s) for each frame and maps the allocated destination port(s) to the active emulated circuit-switched channel(s).

While the circuit-switched emulated channel(s) remains active, the call controller handling transmissions for the first (i.e. originating) transmission-control system provides the call and transmission information to a VoIP interface card. The VoIP interface card places the call information in a CAB and the transmission information in the payload. The VoIP interface card encapsulates both the CAB and the payload in one or more UDP/IP/RTP/CESoIP packets. The first transmission-control system sends the UDP/IP/RTP/CESoIP packets to the second transmission-control system. Voice communications usually involve transmission of data from both endpoints. At the opposite end of the CESoIP pipe, the call controller handling the transmissions of the second (i.e., receiving) transmission-control system, provides its call and transmission information to a VoIP interface card. The VoIP interface card places the call information in a CAB and the transmission information in the payload. The VoIP interface card encapsulates both the CAB and payload in one or more UDP/IP/RTP/CESoIP packets. The second transmission-control system sends the UDP/IP/RTP/CESoIP packets to the first transmission-control system while the circuit-switched emulated channel(s) remains active.

Illustratively, along with the CAB, the call controller provides the information for a channel-allocation control-word (CW) to the VoIP interface card, which encapsulates the information in the UDP/IP/RTP/CESoIP packet. The CW may include a control-word extension bit, a channel-allocation bit-field indicator, a loss-of-packet indicator, bits indicating payload length, a channel-allocation-block sequence-number acknowledgement, and a channel-allocation-block sequence-number. Alternatively, the CW may include a CAB information field comprising the following bits indicating: "no CAB" is present; "normal CAB" all channels included; "add-call CAB" includes only newly added channels; "drop-call CAB" includes only newly removed channels; a "CAB refresh" request, but no CAB is included in current packet; a "CAB refresh request" and "normal CAB" included in this packet; "ad-hoc" CESoIP; and payload length.

The CAB maps active channels to their destination ports, which provides the information for both transmission-control systems to synchronize each other with regard to the number of active channel(s). For example, after establishing the CESoIP connection between both transmission-control systems and while there are no active calls, the first transmission-control system may send a CW with an arbitrary channel-allocation-block sequence-number. A correct response from the second transmission-control system is a reply including a CW with the channel-allocation-block sequence-number acknowledgement equal to the sent channel-allocation-block sequence-number.

While there is an active call, either transmission-control system may continuously send the CAB and CW with the circuit-switched transmission data. In this case, the first transmission-control system may send the CW with an arbitrary channel-allocation-block sequence-number. A correct response from the second transmission-control system is a CW including a channel-allocation-block sequence-number acknowledgement that is equal to the received channel-allocation-block sequence-number. The first transmission-control system continues to send the CAB and CW until the second transmission-control system returns an acknowledgement of the sequence number of the last-received CW.

In one alternative, a transmission-control system does not continuously send the CAB and CW. Instead, the transmission-control system sends an updated CAB and CW to the other transmission-control system when emulated circuit-switched channels are newly added or dropped. Alternatively, the transmission-control system may send the CAB and CW without the circuit-switched transmission data, simply to ensure that both ends of the circuit-switched emulated connection are in synchronization. In a further alternative, a transmission-control system sends a CAB refresh packet.

The use of the CAB reduces the cost of migration from TDM-to-Circuit Emulation-to-VoIP for VoIP service providers. The CAB lists the destination UDP ports of each active emulated circuit-switched channel. The VoIP interface circuitry in the service provider's transmission-control system can extract an individual active emulated circuit-switched channel(s) and repackage the channel(s) as a standard VoIP UDP/IP/RTP stream, because the CAB provides all of the necessary information.

Although characterized above as a method, the invention also encompasses an apparatus that performs the method, as well as any computer-readable medium containing instructions which, when executed in the computer, cause the computer to perform the method.

BRIEF DESCRIPTION OF THE DRAWING

These and other features and advantages of the method and apparatus will become more apparent from considering the following description of an illustrative embodiment of the method and apparatus together with the drawing, in which:

FIG. 3 is a flow diagram of a method of providing dynamic bandwidth-allocation in a CESoIP service.

FIG. 4 is a diagram of an exemplary CESoIP packet with a channel-allocation block and a channel-allocation block-control word.

DETAILED DESCRIPTION

Figure 1:
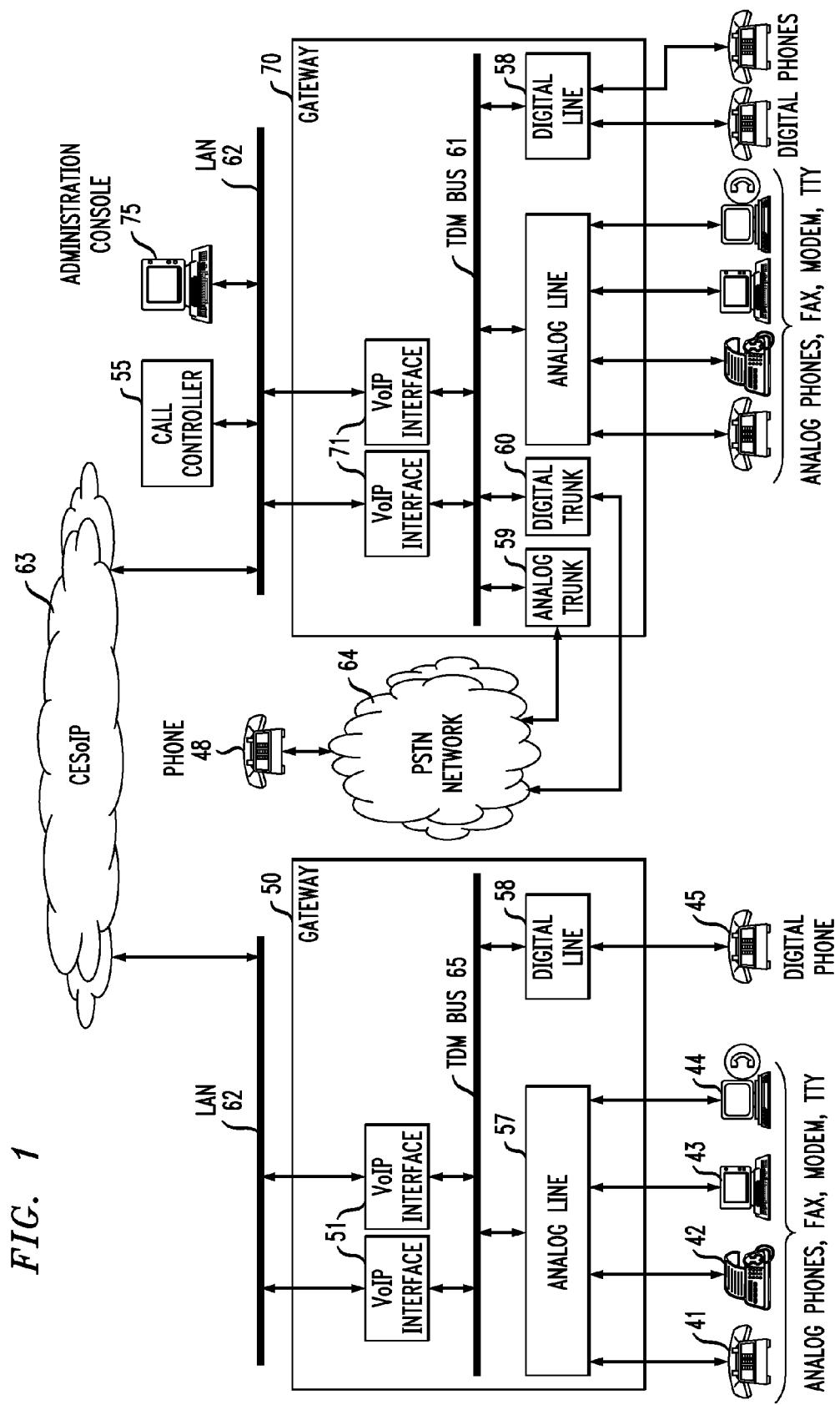
FIG. 1 is a diagram of an exemplary communications network utilizing CESoIP and providing dynamic bandwidth-allocation.

FIG. 1 shows a communications network employing a circuit-emulation service over IP (CESoIP) that efficiently handles bandwidth needs by dynamically allocating bandwidth to active emulated channels. The transmission-control systems 50 and 70 use an in-band technique, that is, the CESoIP packet carries both the circuit-switched transmission data from each active emulated circuit-switched channel and information mapping the active circuit-switched emulated circuit to its destination port. This in-band technique ensures the integrity of the emulated transmission protocol, ex. emulated T1 frame, because timing (i.e., the physical location of each timeslot with respect to the other timeslots) information within the frame remains consistent. Even if there is packet loss, the circuit-switched transmission data within the frame does not shift with respect to other circuit-switched transmission data within the emulated transmission protocol, ex. emulated T1 frame.

Figure 2:
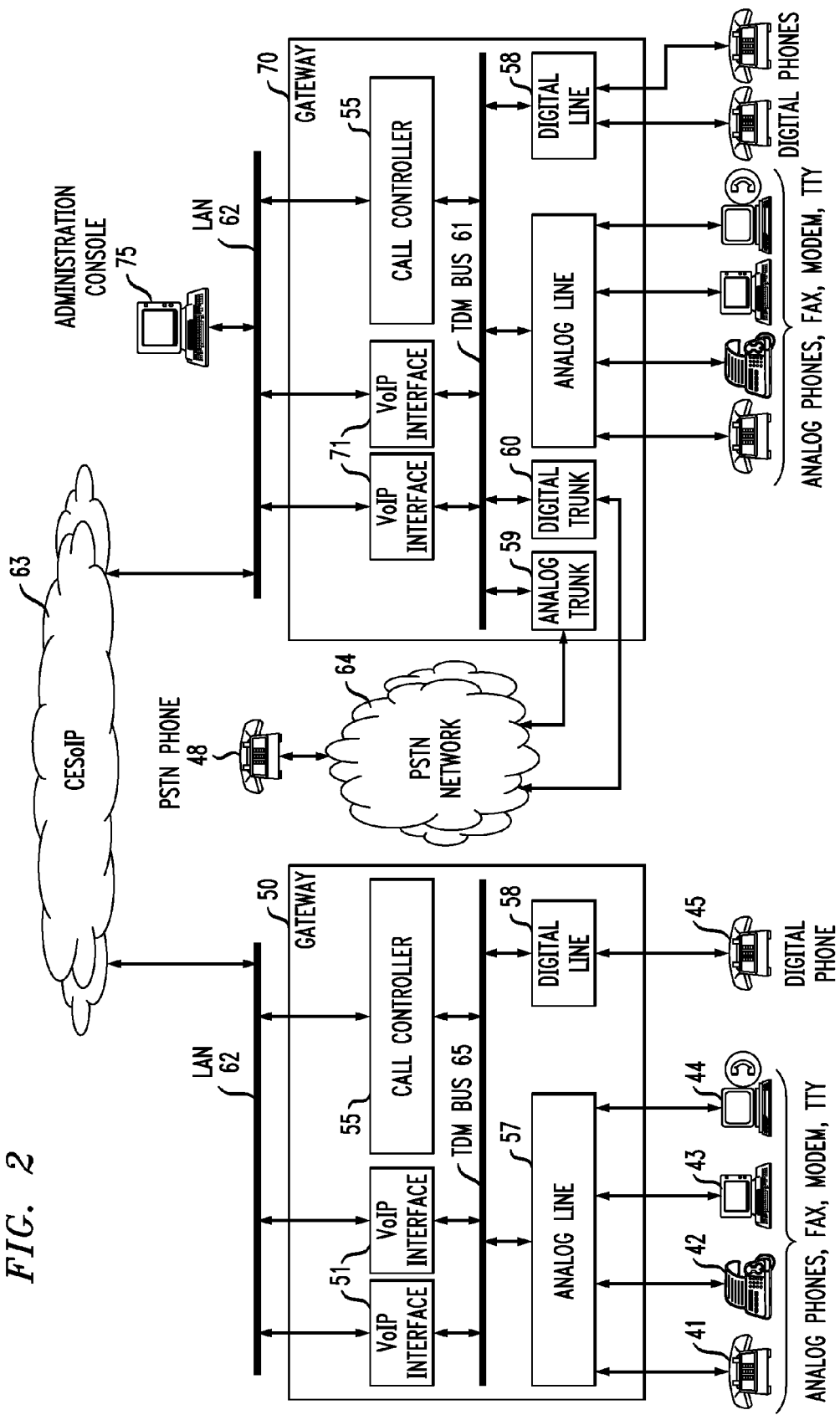
FIG. 2 is a diagram of an alternate communications network utilizing CESoIP and providing dynamic bandwidth-allocation.

As shown in FIGS. 1 and 2, examples of endpoint devices are analog phone 41, facsimile 42, modem in desktop or laptop computer 43, Telecommunications Device for the Deaf/TeleTypewriter (TTY) terminal 44, digital phone 45, and a phone communicating via the PSTN 48. Although not shown, endpoint devices may also include cellular phones, wireless access points, Internet Protocol (IP) devices, and other handheld devices such as a Blackberry® device or a PALM® device.

Transmission-control systems 50 and 70 operate as gateways. Gateways 50 and 70 terminate signaling between endpoint devices and other transmission-control systems. Gateways 50 and 70 also convert various media from one type to another type, such as analog to IP, proprietary digital to IP, or TDM to IP. Call controller 55 handles the call processing for transmissions originating from gateways 50 and 70. FIG. 1 shows call controller 55 residing on a separate media server on LAN 62. FIG. 2 shows a separate call controller 55 in each of the gateways 50 and 70. Call controller 55, includes the call-processing stored program code (i.e., hardware, software and firmware) that completes transmission requests for voice, data, and video circuit-switched transmission data. Also call controller 55 completes connections to one or more private and public switched telephone networks (PSTN) 64, local area networks (LAN) 62, ATM networks (not shown), MPLS, Ethernet networks, and/or the Internet using CESoIP 63. Some other common terms for the transmission-control system are Call Server, Gatekeeper (an H.323 term), Media Gateway Controller (an H.248 term), and SIP Controller (a SIP term). For example, gateway 50 allows an analog phone 41 to communicate with an IP phone (not shown). Similarly, gateway 50 allows an analog phone 41 to communicate with an external caller 48 across a TDM trunk, such as an Analog Trunk 59 (ex. T1) or a Digital Trunk 60 (ex. ISDN BRI). The following are some types of circuit-switched data that gateway 50 may encounter: 64 kbps channel from analog phone 41; 64 kbps uncompressed data from facsimile 42; constant delay 64 kbps uncompressed data from modem 43; 64 kbps uncompressed data from TTY device 44; low bit-rate modem data; constant-delay data; 64 kbps (uncompressed) data from secure telephone units (STU) (not shown); BRI data with encryption; clear channel 64 kbps data from secure terminal equipment office telephone (STE phones) (not shown); or high-bandwidth DS0 channel-aggregation video data with frame integrity (not shown).

Establishing a CESoIP Connection Between Transmission-Control Systems

To establish a dedicated virtual CESoIP communication connection between gateways 50 and 70, call controller 55 allocates a static UDP port for each of the gateways 50 and 70. This allocation can be performed manually by an administrator via administration pages, by default using default factory settings, or automatically by stored program code. An IP address and the static UDP port define each endpoint of the CESoIP connection and is used to route the CESoIP packet to each of the gateways 50 and 70. In this embodiment, once the CESoIP logical connection is defined for both endpoints, each endpoint starts-up the CESoIP connection independently. At this point, the CESoIP connection is available for emulated circuit-switched data transmission between both transmission-control systems. This CESoIP connection remains active even while there are no active calls between gateways 50 and 70.

In addition to sending and receiving voice, data, or video circuit-switched transmission data, gateways 50 and 70 may use the CESoIP connection to transmit timing and maintenance data to keep the CESoIP connection healthy. RTP timestamps and RTP sequence numbers provide some timing information. Maintenance information may include a "loss-of-packet indicator," which tells the receiving gateway 70 that the sending gateway 50 is no longer receiving packets or that some packets did not arrive based on missing RTP sequence numbers. Additional maintenance information may be included in a channel-allocation block (CAB).

In another alternative, call controller 55 establishes the CESoIP connection on an ad-hoc or as needed basis. In this embodiment, IP packets are used to signal the request for the CESoIP pipe between gateways 50 and 70. The call controller 55 handling the transmission requests between both gateways 50 and 70 automatically allocates a static UDP port for both ends of the ad-hoc CESoIP pipe. The receiving gateway 50 and 70 acknowledges the ad-hoc CESoIP request and satisfies the request by establishing the CESoIP connection. A particular range of static UDP ports may be set aside in each of the gateways 50 and 70 for this specific purpose, such as, establishing virtual communication-connections. From this range, for example, a call controller 55 may select a new static UDP port number for each "ad-hoc" CESoIP pipe.

Alternatively, to start-up an ad-hoc CESoIP connection, the call controller 55 may send a CW with a "CAB refresh request," but without a CAB. The refresh request signals to the gateway at the receiving end that a new CAB has been requested. If no calls are present at the time, a CW without a CAB will be sent in reply, but with a matching CAB sequence number acknowledgement.

CESoIP Dynamic Bandwidth Management

After establishing the CESoIP connection between gateways 50 and 70, the CESoIP service may now begin the dynamic bandwidth-management. As a part of call set-up at the location that is originating the transmission (for example, analog endpoint 41 at gateway 50), the call controller 55 allocates a first destination UDP port for the circuit-switched emulated channel that carries the circuit-switched transmission data. The first destination UDP port defines the digital signal processing (DSP) resource in the VoIP interface card 51 at gateway 50 that will be handling circuit-switched data, timing, and maintenance issues for the particular active emulated circuit-switched channel. At the receiving end of the transmission (for example, analog endpoint 41 at gateway 70), the call controller 55 allocates a second destination UDP port for the circuit-switched emulated channel that carries the circuit-switched data transmission. The second destination UDP port defines the DSP resource in the VoIP interface card 71 at gateway 70 that will be handling circuit-switched data, timing, and maintenance issues for the particular active emulated circuit-switched channel. Identities of the first and second destination ports are exchanged between each of the gateways 50 and 70 as part of call set-up. While there is an active call, each gateway will continue to send the UDP destination port within the CAB.

In an alternative design, a VoIP interface card allocates the destination UDP port for the circuit-switched emulated channel that carries the circuit-switched transmission data. For example, as a part of call set-up at the originating location, VoIP interface card 51 in gateway 50 allocates the first destination UDP port. As previously mentioned, the first destination UDP port defines the DSP resource in the VoIP interface card 51 in gateway 50 that will be handing the particular active emulated circuit-switched channel. At the receiving end of the transmission (for example, analog endpoint 41 at gateway 70), the VoIP interface card 71 in gateway 70 allocates the second destination UDP port for the circuit-switched emulated channel that carries the circuit-switched transmission data. The second destination UDP port defines the DSP resource in the VoIP interface card 71 in gateway 70 that will be handling the particular active emulated circuit-switched channel. As previously mentioned, identities of the first and second destination ports are exchanged between each of the gateways 50 and 70 as part of call set-up.

After gateways 50 and 70 exchange call set-up information, the circuit-switched data transmission begins on the newly-active emulated circuit-switched channel. Call controller 55 on gateway 50 provides information regarding the call information including the destination UDP port and the transmission information to the VoIP interface card 51. Upon arrival of this information, the VoIP interface card 51 creates a CAB and sends the CAB along with transmission data encapsulated in a UDP/IP/RTP/CESoIP packet to destination VoIP interface card 71 at gateway 70. Likewise at gateway 70, call controller 55 provides call information including the destination UDP port and the transmission to the VoIP interface card 71. Upon arrival of the information, the VoIP interface card 71 creates a CAB with the CAB information and sends the CAB along with transmission data encapsulated in a UDP/IP/RTP/CESoIP packet to destination VoIP interface card 51 at gateway 50.

VoIP interface cards 51 and 71 send a channel-allocation block control word (CW) 230 with each CAB 240 (FIG. 4). The CW 230 includes a control-word extension, which indicates when a CAB 240 follows the CW in the CESoIP packet; a channel-allocation bit-field indicator; a loss-of-packet indicator; bits indicating payload length; a channel-allocation-block sequence-number acknowledgement; and a channel-allocation-block sequence number. In an alternative embodiment, the CW 300 includes additional functionality for adding and removing individual channels and for making a CAB refresh request. This alternative CW 300 (FIG. 5) may include the following: a control-word extension, which indicates when a CAB follows this alternative CW in a CESoIP packet; a loss-of-packet-indicator; CAB Information Field; and payload length; CAB Sequence Number Acknowledgement and CAB Sequence Number. In this alternative CW, the CAB Information Field may include bits to indicate no CAB is present; "normal CAB" which includes all channels; "add-call CAB" which includes only newly added channels; "drop-call CAB" includes only newly removed channels; CAB refresh request but no CAB follows the CW; CAB refresh request and a CAB follows the CW.

The CAB 240 maps active channels to their destination ports, which provides synchronization data to both gateways 50 and 70 with regard to the number of active emulated circuit-switched channel(s). For example, after establishing the CESoIP connection between both gateways 50 and 70 and while there are no active calls, gateway 50 may send the CW 230, 300 with an arbitrary channel-allocation-block sequence-number 237, 325. A correct response from the second gateway 70 is a CW 230, 300 with the channel-allocation-block sequence-number acknowledgement 236, 320 being equal to the received channel-allocation-block sequence-number 237, 325.

While there is an active call, either gateway may continuously send the CAB 240 and CW 230, 300 with the circuit-switched transmission data. In this case, a first gateway 50 may send a CW 230, 300 with a channel-allocation-block sequence-number 237, 325. A correct response from a second gateway 70 is a CW 230, 300 reply including a channel-allocation-block sequence-number acknowledgment 236, 320 that is equal to the received channel-allocation-block sequence-number 237, 325. The first gateway shall continue to send the CAB 240 and CW 230, 300 until the second transmission-control system returns an acknowledgement 236, 320 of the sequence number of the last-received CW 230, 300.

In one alternative embodiment, a gateway does not continuously send the CAB 240 and CW 230, 300. Instead, the gateway sends an updated CAB 240 and CW 230, 300 when there is a newly added or dropped active emulated circuit-switched channel. Alternatively, the transmission-control system may send the CAB 240 and CW 230, 300 without the transmission data, simply to ensure that both ends of the emulated circuit-switched connection are in synchronization.

Sample Call Flows

Gateways 50 and 70 include various line cards. If the transmission, i.e., call, is from an analog phone 41 on gateway 50 to digital phone 45 on gateway 70, the circuit-switched transmission data may be routed over the Internet 63 using CESoIP. Analog line card 57 takes the analog data from an analog phone 41 connected to gateway 50, and a codec (ex. G.711) within the analog line card 57 digitizes the analog data. The analog line card 57 places the digital data on the time-division multiplex (TDM) bus 65. For voice, fax, or modem transmissions, alternate codecs may be used, such as a codec that generates uncompressed 16-bit linear samples, or G.726 (ADPCM compression). Via administration console 75, an administrator can configure the codec type to allow the analog line card 57 to support numerous codecs. The codec type is conveyed through the payload type within the RTP header portion of the UDP/IP/RTP/CESoIP packet.

The VoIP interface card 51 takes the call information and digital transmission data from the TDM bus 65, and places it in one or more UDP/IP/RTP/CESoIP packets. The UDP/IP/RTP/CESoIP packets may also include a channel-allocation block (CAB) 240 and channel-allocation-block control word (CW) 230, 300. The call controller 55 handling transmissions for gateway 50 provides the VoIP interface card 51 on gateway 50 the appropriate routing information for inclusion in the packet header to route the transmission data to digital phone 45 on gateway 70. Additionally, for voice transmissions (including conference calls), the analog line card 57 provides echo cancellation. Upon detection of voice-band data such as modem, fax, TTY, the analog line card 57 switches into pass-through mode and disables echo cancellation.

Gateway 50 also includes digital line card 58. Digital line card 58 takes digital transmission data from the digital phone 45 and places it on the TDM bus 65. The call controller 55 provides the call information to the VoIP interface card 51. The VoIP interface card 51 on gateway 50 takes the call information and creates a CAB that is part of the UDP/IP/RTP/CESoIP packet. The VoIP interface card 51 uses the digital transmission data from the TDM bus 65 and places it in the payload of one or more UDP/IP/RTP/CESoIP packets. The VoIP interface card 51 places the appropriate routing information is in the UDP/IP/RTP/CESoIP packet header.

A UDP/IP/RTP/CESoIP packet includes a CW, but may or may not include a channel-allocation block depending on whether there are any active emulated circuit-switched channels.

As previously stated, call controller 55 provides routing information to route the circuit-switched transmission data between endpoint devices, such as analog devices 41-44, digital devices 45, or IP devices (not shown), within an enterprise. The call controller 55 also provides routing information for circuit-switched transmission data from an endpoint device 48 outside of the enterprise to an endpoint within the enterprise, such as analog endpoint 41-44 or digital phone 45 communicating via gateway 70. In this case, an analog trunk card 59 (ex. T1) or digital trunk card 60 (ex. ISDN BRI) takes the circuit-switched transmission data from the PSTN 64 and places it on the TDM bus 61. The VoIP interface card 71 encapsulates the call routing information and circuit-switched transmission data into one or more UDP/IP/RTP/CESoIP packets. The transmission is sent over the Internet using CESoIP 63 to gateway 50. At gateway 50, call controller 55 allows for conversion of the circuit-switched transmission data within the one or more UDP/IP/RTP/CESoIP packets to the appropriate protocol for playout to the appropriate analog endpoint device 41-45 or digital endpoint device 45.

Administration console 75 provides one mechanism to administer gateways 50 and 70. The administrator may use either command-line instructions, a graphical user interface (GUI) or an HTTP interface on console 75 to perform the administration. Alternatively, administration may be performed from a remote terminal (not shown) via local area network (LAN) 62 that has secure access to gateways 50 and 70, call controller 55, and VoIP interface cards 51 and 71.

VoIP interface cards 51 and 71 employs several mechanisms to combat packet loss or jitter, and reduce delay. To combat packet loss, the first mechanism is Forward Error Correction (RFC 2733). The second mechanism is the use of redundant audio data in the RTP packet (RFC 2198). The call controller 55 applies either one of these two mechanisms based on measured packet loss.

To combat jitter, VoIP interface cards 51 and 71 uses several mechanisms. For data applications, VoIP interface cards 51 and 71 use common FIFO-style jitter buffers. For voice applications and based on timing extraction data, the size of the jitter buffers may remain fixed to maintain constant delay or at least the lowest tolerable delay. Additionally, a fixed-size jitter buffer may eliminate and minimize clock slips for real-time applications that need it, such as voice. For voice-band data such as modem, facsimile and TTY, a FIFO style jitter buffer in simple FIFO mode may be sufficient to maintain a constant delay and protect against timing slips of the channels relative to each other. In the case of dropped packet, it may be necessary to fill other packets with equal amounts of transmission data to help maintain constant delay. If a constant delay is not necessary, a dynamic jitter buffer may be used.

To reduce delay, the CESoIP individual channel-buffer size may not be fixed, and may vary as emulated circuit-switched channels are added or dropped. The CESoIP individual channel-buffer size is a configurable parameter within call controller 55. The administrator may configure the CESoIP individual channel-buffer size at the low end to lower delay and to minimize disruption due to lost packet(s). Alternatively, the individual channel-buffer size may be increased to improve the bandwidth efficiency. Note, the default value for an individual channel buffer unit may be 1 ms (i.e., 8 bytes of G.711 data).

VoIP interface cards 51 and 71 provide frame integrity for video applications to maintain a consistent time order of the channels relative to each other, that is, no slipping or shifting relative to the other channels. This is a consideration for certain video transmission formats, such as Bonding, which send a video signal over multiple DS0 channels. Once the multiple-channel call is set-up, it is assumed that no slipping or shifting will occur, and the video gear removes any framing information. Frame integrity is inherent, because there is a specific identification of the number of active channels within a packet, which makes it less likely the channels will shift with regard to each other. There may be a loss of a whole packet or a number of packets, but that does not shift the channels relative to each other and the video will restore itself when the packet stream resumes.

FIG. 3 is a flow chart of the method described above. In step 80, an endpoint device—analog device 41-44 or digital device 45—communicating with gateway 50 goes off hook and enters the appropriate contact information, (ex. digits) to connect to an endpoint device—analog device 41-44 or digital device 45—communicating with gateway 70. In this example, it is assumed that a dedicated virtual CESoIP connection is already established between both gateways. In gateway 50, the call controller 55 handling communication needs for gateway 50 begins the call set-up process by signaling to the call controller handling communication requests for gateway 70 that a call set-up is requested. In one embodiment, one call controller 55 may handle communication requests and set-up each leg of the call for one or more gateways (ex. gateways 50 and 70 as in FIG. 1). In an alternative embodiment as shown in FIG. 2, a separate call controller 55 may reside in each gateway 50 and 70 to handle the respective gateway's communication needs. At the destination gateway 70, the appropriate endpoint device—analog device 41-44 or digital device 45—is ringing. Meanwhile, the VoIP interface card 51 on gateway 50 allocates a unique UDP destination port for this emulated circuit-switched channel. If the call is answered, call controller 55 establishes a call using an emulated circuit-switched connection for each leg of the call.

In step 90, the call has been answered, and circuit-switched transmission data (voice, video, or data) is digitized and placed on TDM bus 65 by analog line card 57 or digital line card 58. For example, voice data is collected in frames of N octets occurring at 8 kHz rate or N*64 kbps.

In step 100, VoIP interface card 51 takes TDM transmission data off the TDM bus 65 and encapsulates it as a payload in one or more UDP/IP/RTP/CESoIP packets. Here each UDP/IP/RTP/CESoIP payload of circuit-switched transmission data contains M frames of N octets occurring at a multiple of 8 khz rate. The call controller 55 provides to the VoIP interface card 51 on Gateway 50 the call information required to create the CESoIP channel-allocation-block control word (CW) and the channel-allocation block (CAB). The CAB maps each particular emulated active circuit to an allocated unique UDP destination port.

In step 110, the VoIP interface card 51, via Gateway 50, sends the UDP/IP/RTP/CESoIP packet(s), which includes the CW, CAB, and payload, to gateway 70 via gateway 70's IP address and the static destination UDP port allocated for the CESoIP virtual connection on gateway 70. At gateway 70, the UDP/IP/RTP/CESoIP packet is disassembled by VoIP interface card 71, which sends each active emulated circuit-switched channel's data to the appropriate DSP resource via the UDP destination port identified in the CAB. At this point, the VoIP interface card 71 may be using forward error-correction (RFC 2733) and redundancy correction (2733) to combat packet loss. The jitter buffers are collecting CESoIP circuit-switched transmission data and placing the data in the correct time sequence based on RTP time-stamps and sequence number. The VoIP interface card 71 places the correctly-sequenced buffered data on the TDM bus 61 to the appropriate endpoint—analog endpoint 41-44 or digital endpoint 45. At this time, the transmission data comprises frames of N octets occurring at 8 kHz rate.

In step 120, while there are active emulated circuit-switched channels, the VoIP interface card 51 periodically sends the CW 230, 300 and CAB 240 with the transmission data (voice, video, or data) to synchronize the reception of the transmission data at gateway 70. The RTP sequence packet number in the RTP header provides sequencing data such that channel data in the CAB 240 are sequenced with the CESoIP transmission data payload. Not every CESoIP packet contains a CAB 240, but a CAB 240 is sent when calls are added and/or dropped. The CAB 240 notifies the destination gateway 70 when there is a dropped emulated active circuit (the call has ended and the endpoint is on-hook) by inference, since the CAB 240 maps each active remaining circuit to its UDP destination port. An administrator may decide to administer how often to send the CAB 240 with the CESoIP circuit-switched transmission data, or may allow call controller 55 or VoIP interface cards 51 and 71 to decide.

The CESoIP packet may vary in size depending on the number of active channels and the size of the CAB 240. The call controller 55 or VoIP interface cards 51 and 71 may decide to send a CESoIP packet solely with a CAB 240 and CW 230, 300, and within the same RTP stream as the circuit-switched transmission data, to maintain frame synchronization. This is the proper action if the number of emulated circuit-switched channels becomes large and the CAB 240 along with the circuit-switched transmission data will not fit into a CESoIP packet. Similarly, the CAB 240 is not sent in the CESoIP packet if the CESoIP packet may exceed the allowed CESoIP packet size. Instead, the CAB 240 is sent in another CESoIP packet without the CESoIP circuit-switched transmission data.

FIG. 4 is a diagram of the UDP/IP/RTP/CESoIP packet 200 with Channel-allocation Block (CAB) 240. The CESoIP packet includes UDP/IP header 210, RTP header 220, CESoIP Control Word (CW) 230, optional Channel-allocation Block (CAB) 240, and circuit-switched transmission data payload 250 of N*M octets where N is equal to the number of active channels and M is equal to the number of frames. As shown in FIG. 4, traffic from the different channels, is interleaved in payload 250. For example, the payload may be in this order: channel 0 byte 0, channel 1 byte 0, channel 2 byte 0, channel N byte 0, etc. Alternatively, an administrable option in call controller 55 and VoIP interface cards 51 and 71 is to order the payload in a non-interleaved format for easier distribution of the channels. For example, the payload may be in this order: channel 1 byte 1, byte 2, ... byte N, followed by channel 2 byte 1, byte 2, ... byte N.

The CESoIP Control Word (CW) 230 is four bytes long. In the first two bytes, bits 5 through 15 indicate the payload length 235. Bits 3 and 4 are reserved for future use 234. Bit 2 is the loss of packet(s) indicator (LOPI) 233. Bit 1 is the channel-allocation bit-field indicator (CABI) 232. When CABI 232 is set to 1, the CAB is present in the CESoIP packet. Bit 0 is the control word extension 231 which allows for future growth or extension of the Control Word. In bits 24 thru 31 are the CAB seq. number 237. The CAB seq. number 237 indicates the current or last CAB sent. Bits 16 through 23 indicate the most recent CAB sequence number received.

The channel-allocation block (CAB) 240 lists active emulated circuit-switched channels and provides in-band dynamic bandwidth assignment. In the first two bytes, bits 7 through 15 indicate the number of emulated circuit-switched channels that are active 241. A total of 512 (i.e., $2^9$) active emulated circuits can be accommodated. Hence, if there are three active channels, for example, channels 1, 10 and 15, then bits 7 through 15 would appear as 000000011. In this case, there would be three unique UDP destination ports listed in the payload 244.

In the first byte of CAB 240, bits 1 through 6 are reserved, but may be used as necessary to increase the number of active emulated circuit-switched channels if support for more than 512 channels are needed. Bit 0 is the CAB Extension (E) 243. UDP port destination data is present when the CAB Extension 243 equals 1. CAB 244 lists the destination UDP port for each active emulated circuit-switched channel. The order of the UDP port specifies the order of the octets within the frame.

Figure 5:
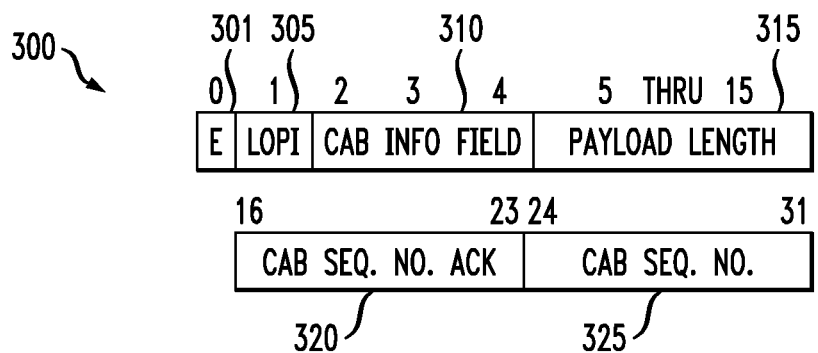
FIG. 5 is a diagram of an alternate channel-allocation block-control word.

FIG. 5 depicts an alternative Control Word (CW) 300 with additional functionality for adding or removing channels and includes a CAB refresh request option. This alternative CESoIP Control Word (CW) 300 is four bytes long. In the first two bytes, bits 5 through 15 indicate the payload length 315. Bits 2 thru 4 is the CAB Information Field 310. The options for bits 2, 3, and 4 of the CAB Information Field 310 are as follows: 000=no CAB present; 001="normal CAB" includes all channels; 010="add-call CAB" includes only newly added channels; 011="drop-call CAB" includes only newly removed channels; 100=CAB refresh request but no CAB is included in current packet; 101=CAB refresh request and "normal CAB" included in this packet; 110=reserved; 111=reserved.

Other fields in the alternative CW 300 are described as follows. Bit 1 is the loss of packet(s) indicator (LOPI) 305. Bit 0 is the control word extension 301 which allows for future growth or extension of the CW 300. In bits 24 thru 31 are the CAB Sequence Number 325. The CAB Sequence Number 325 indicates the current or last CAB sent. Bits 16 through 23 indicate the most recent CAB Sequence Number Acknowledgement received 320.

Note, the order of the UDP ports in CAB 250 (FIG. 4) implies the order of the channel bytes. But, when an alternate CW 300 is used and the CAB Info Field bits are set to signal that the CAB 250 has channel information regarding added calls or dropped calls (bits set to 010 for newly added channels and bits set to 011 for newly removed channels), the channel byte ordering is modified. For example, when the CAB 250 has channel information regarding only newly added calls, the "add-call CAB," the VoIP interface cards 51 and 71 will append these bytes to the end of the previous CAB in the order given by the add-call CAB. When the CAB 250 has channel information regarding only newly removed channels, the "drop-call CAB," VoIP interface cards 51 and 71 will remove the channels from the previous CAB order and the remaining channels in the previous CAB remain in the same relative order.

Error Handling Scenarios

In a first scenario, if an unexpected CAB sequence number 237, 325 is received without having received a corresponding CAB 250, the current state of calls is unknown and the receiving gateway must mute all channels or take other corrective action such that crosstalk cannot occur. To eliminate crosstalk at the first gateway, the call controller 55 or VoIP interface cards 51 and 71 may decide to continue to send a CAB in each UDP/IP/RTP/CESoIP packet with or without circuit-switched transmission data until the destination gateway sends an acknowledgement of the CAB with a matching sequence-number acknowledgement 236, 320 in the CW 230, 300. For example, gateway 50 subtracts 1 from the CAB Seq. No. ACK 236. At gateway 50, if a disparity exists between its transmitted CAB Seq No, 237 and the received CAB Seq No ACK 236 from gateway 70, the call controller 55 or VoIP interface card 51 in gateway 50 would re-send the latest CAB (i.e., a CAB refresh). When call controller 55 or VoIP interface card 51 in gateway 50 receives a matching sequence-number acknowledgement in the CW, it ceases transmission of CAB until occurrence of the next administered period or until a call is next added or dropped.

Alternatively, the call controller 55 or VoIP interface card 51 in gateway 50 can periodically send a limited number of CABs (ex. 2 or 3) without circuit-switched transmission data and wait for the CAB Seq. No. ACK 236 from gateway 70. If, after some administered time-out, the call controller 55 or VoIP interface card 51 in gateway 50 does not receive the sequence-number acknowledgement 236, the VoIP interface card 51 may retransmit another CAB 250. By sending fewer CABs, this alternative uses less bandwidth during the time-period when gateway 50 is waiting for the sequence-number acknowledgement 236. Otherwise, if there is a short network outage during this time-period, the network could be burdened with a large number of CABS 240, which worsens the network outage. In an alternative embodiment, the call controller 55 or VoIP interface card 51 uses the alternative CW 300 and selects either bits 100 or 101 in the CAB Info Field 310 to explicitly indicate that a CAB refresh has been requested.

In a second scenario, if an unexpected CAB UDP port is received, the VoIP interface cards 51 and 71 may discard the associated channel for the time being until the proper call information is received by the call controller 55. In this case, the VoIP interface cards 51 and 71 may process the remaining ports, but with care such that no crosstalk occurs.

Migration from TDM-to-CESoIP-to-VoIP for Service Providers

The use of the CAB 240 reduces the cost of migration from TDM-to-Circuit Emulation-to-VoIP for VoIP service providers. The VoIP interface cards 51 and 71 in the service provider's transmission-control system 50 and 70 can extract an individual active emulated circuit-switched channel(s) from the CAB, and repackage the channel(s) as a standard individual VoIP UDP/IP/RTP stream. To create this individual RTP stream to send, for example to an IP endpoint, the VoIP interface cards 51 and 71 in the service provider's transmission-control system 50 and 70 generates a new IP header, UDP header, RTP header and payload. For example, the VoIP interface card 51 generates the UDP, IP, and RTP packet headers following known standards using the call information available in the UDP/IP/RTP/CESoIP packet headers, the destination UDP port information in the CAB 240, and transmission information available in the payload. First, the VoIP interface cards 51 and 71 generate the IP header using the appropriate call routing information from the IP header of the UDP/IP/RTP/CESoIP packet.

Second, the UDP header consists of UDP source and destination ports, a length, and a checksum. The source UDP port is assigned either by the call controller 55 or VoIP interface card 51 during call set-up to designate a UDP port in the VoIP interface card 51 that is handling the transmission from the originating transmission-control system. The assigned source UDP port is not transmitted in the CESoIP packet, but the VoIP interface card 51 stores this information while the call is active. The UDP destination port designates a UDP port in the VoIP interface cards 51 and 71 in the transmission-control system receiving the transmission, and the UDP destination port is extracted from the CAB for the given active emulated circuit-switched channel. The VoIP interface cards 51 and 71 generate the remainder of the UDP header, that is, the length and checksum locally as it would with any standard IP/UDP stream.

Third, the VoIP interface cards 51 and 71 generate the RTP header by re-using the "payload type" and the "timestamp" from the CESoIP RTP header locally as per standards. In one embodiment, the VoIP interface cards 51 and 71 may perform a "sampling" of the timestamps. The sampling technique is useful since the outgoing VoIP RTP stream will likely have a larger per-packet sample buffer, e.g., 160 bytes. In this case, the VoIP interface cards 51 and 71 may "sample" the CESoIP RTP timestamp at periods equal to that buffer size.

Fourth, the VoIP interface cards 51 and 71 generate the RTP payload by copying the transmission information from the CESoIP payload. If the outgoing VoIP RTP stream has a larger per-packet sample buffer, the VoIP interface cards 51 and 71 may buffer the transmission information from the CESoIP payload to a preferred packet size, and then place the information into the RTP payload.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims except insofar as limited by the prior art.

What is claimed is:

1. An apparatus for circuit-switching emulation over Internet Protocol (IP) providing in-band dynamic bandwidth-management, comprising:
    a call controller establishing a circuit emulation service over IP (CESoIP) connection between a first transmission-control system and a second transmission-control system;
    the call controller for handling a transmission and for allocating a first port of a first transmission-control system for at least one active emulated circuit-switched channel;
    the call controller further operable for providing information to create a channel-allocation block that identifies, by an IP address, the at least one active emulated circuit-switched channel and a destination port allocated for the at least one active emulated circuit-switched channel on the first transmission-control system;
    wherein the first transmission-control system is operable to encapsulate the channel-allocation block into a header of a Real-time Transfer Protocol (RTP) packet; and
    wherein the first transmission-control system is further operable to send the RTP packet, which includes the channel-allocation block and the transmission, to a second transmission-control system while the at least one active emulated circuit-switched channel remains active.

2. The circuit-switching emulation apparatus of claim 1, wherein said first transmission-control system is further operable to periodically send said channel-allocation block to said second transmission-control system.

3. The circuit-switching emulation apparatus of claim 1, wherein said channel-allocation block includes a control word comprising:
    at least one bit for a control-word extension;
    at least one bit for a channel-allocation bit-field indicator;
    at least one bit for a loss-of-packet indicator;
    at least one bit for indicating payload length;
    at least one bit indicating a channel-allocation-block sequence-number acknowledgement; and
    at least one bit indicating a channel-allocation-block sequence number.

4. The circuit-switching emulation apparatus of claim 1, wherein said first transmission-control system is further operable to encapsulate a transmission into the payload of the RTP packet.

5. The circuit-switching emulation apparatus of claim 1, wherein said call controller is further operable for designating said destination port from a group comprising: a unique circuit number identifier in a synchronous network, and a User Datagram Protocol (UDP) port in a packet-switched network.

6. The circuit-switching emulation apparatus of claim 1, wherein said first transmission-control system is further operable for extracting an active emulated circuit-switched channel and transmitting it as a Voice over Internet Protocol (VoIP) RTP stream.

7. The circuit-switching emulation apparatus of claim 1, wherein said call controller is further operable for creating a circuit-emulation service between said first and second transmission-control systems by allocating a static User Datagram Protocol (UDP) port as said first port when said first and second transmission-control systems are administered.

8. The circuit-switching emulation apparatus of claim 1, wherein said channel-allocation block includes a control word comprising:
    at least one bit for adding emulated circuit-switched channels;
    at least one bit for dropping emulated circuit-switched channels; and
    at least one bit to request a CAB refresh.

9. A circuit-switching emulation service over Internet Protocol (IP) providing dynamic bandwidth allocation, comprising the steps of:
    a first transmission-control system originating transmission data for at least one active emulated circuit-switched channel through a circuit-emulated service over IP (CESoIP) connection;
    a call controller providing channel-allocation data for mapping said at least one active emulated circuit-switched channel to a destination port at a second transmission-control system, wherein the mapping includes an IP address and static UDP port information;
    said transmission-control system periodically sending in-band said channel-allocation mapping data with said transmission data, while said at least one active emulated circuit-switched channel remains active, wherein said channel-allocation data is encapsulated in a Real-time Transfer Protocol RTP packet; and
    said first transmission-control system extracting an active emulated circuit-switched channel and transmitting it as a VoIP channel.

10. The circuit-switching emulation service of claim 9, wherein said first transmission-control system sends said channel-allocation mapping data periodically without said transmission data.

11. The circuit-switching emulation service of claim 9, wherein said first transmission-control system sends updated channel-allocation mapping data when adding an active emulated circuit-switched channel.

12. The circuit-switching emulation service of claim 9, wherein said first transmission-control system sends updated channel-allocation mapping data when dropping an active emulated circuit-switched channel.

13. The circuit-switching emulation service of claim 9, wherein said channel-allocation mapping data further include a sequence number, and said first transmission-control system continues to send said channel-allocation mapping data until said second transmission-control system acknowledges said sequence number.

14. An apparatus for circuit-switching emulation service over Internet Protocol (IP) providing dynamic bandwidth allocation, comprising:
    a first transmission-control system operable for originating transmission data for at least one active emulated circuit-switched channel over a circuit-emulated service over IP (CESoIP) pipe;

said first transmission-control system further operable for encapsulating channel-allocation mapping data for mapping said at least one active emulated circuit-switched channel to a destination port at a second transmission-control system, wherein the channel-allocation mapping data includes an IP address and a static UDP port information, and wherein said channel-allocation mapping data is encapsulated in a Real-time Transfer Protocol (RTP) packet;

said transmission-control system further operable for periodically sending in-band said channel-allocation mapping data with said transmission data, while said at least one active emulated circuit-switched channel remains active; and said first transmission-control system further operable for extracting an active emulated circuit-switched channel and transmitting it as a Voice over Internet Protocol (VoIP) channel.

15. The circuit-switching emulation apparatus of claim 14, wherein said first transmission-control system is further operable to update said channel-allocation mapping data when adding an active emulated circuit-switched channel.

16. The circuit-switching emulation service of claim 14, wherein said first transmission-control system is further operable to update said channel-allocation mapping data when dropping an active emulated circuit-switched channel.

17. The circuit-switching emulation service of claim 14, wherein said first transmission-control system is further operable for periodically sending said channel-allocation mapping data without said transmission data, while one of said plurality of active emulated circuits remains active.

18. A non-transitory computer-readable medium containing instructions which, when executed in the computer, cause the computer to perform the service of claim 9.

* * * * *